United States Patent [19]
Jerome

[11] Patent Number: 6,109,215
[45] Date of Patent: Aug. 29, 2000

[54] LOADING AND UNLOADING APPARATUS AND METHOD INCORPORATING SLIDING FLOOR SYSTEM

[76] Inventor: Wallace H. Jerome, 1480 E. Maple Ave., Barron, Wis. 54812

[21] Appl. No.: 09/160,767

[22] Filed: Sep. 24, 1998

[51] Int. Cl.$^7$ .................................................. A01K 29/00
[52] U.S. Cl. .......................................... 119/843; 119/845
[58] Field of Search ..................................... 119/843, 844, 119/845, 458; 414/393, 401, 411, 416, 507

[56] References Cited

U.S. PATENT DOCUMENTS

| | | | |
|---|---|---|---|
| 3,796,189 | 3/1974 | Blondeel | 119/489 |
| 4,037,565 | 7/1977 | Ledwell, Jr. | 119/846 |
| 4,074,658 | 2/1978 | Mermelstein et al. | |
| 4,600,351 | 7/1986 | Nelson | 119/846 |
| 4,768,465 | 9/1988 | Church | 119/442 |
| 5,388,948 | 2/1995 | Jerome | |
| 5,466,116 | 11/1995 | Jerome | |
| 5,470,194 | 11/1995 | Zegers | 414/786 |
| 5,505,582 | 4/1996 | Jerome | |
| 5,570,657 | 11/1996 | Kuhlmann | 119/458 |
| 5,735,664 | 4/1998 | Jerome | |

*Primary Examiner*—Peter M. Poon
*Assistant Examiner*—Yvonne R. Abbott
*Attorney, Agent, or Firm*—Merchant & Gould P.C.

[57] ABSTRACT

A method and apparatus for loading a batch of turkeys or other cargo into multilayer containers. A method of unloading the turkeys or cargo from the multilayer containers. Each container or coop includes a liftable gate at each end that enables access into the container through either end, and a slidably moveable floor positioned over a rigid permanent floor. As the turkeys are introduced into the containers, the slideable floor is retracted into the container, pulling the bird farther back into the container. Similarly, to unload the turkeys, the slideable floor is extracted from the container, moving the birds out of the container. A removable holding wall may be located at the end of the slideable floor to urge any hesitant turkeys out of the container.

13 Claims, 5 Drawing Sheets

LOADING AND UNLOADING APPARATUS AND METHOD INCORPORATING SLIDING FLOOR SYSTEM

RELATED PATENTS AND APPLICATIONS

The disclosures of my prior U.S. Pat. Nos. 5,388,948 issued Feb. 14, 1995; 5,466,116 issued Nov. 14, 1995; 5,505,582 issued Apr. 19, 1996; and 5,735,664 issued Apr. 7, 1998; and pending U.S. patent applications Ser. No. 08/874,084, filed Jun. 12, 1997 now abandoned, entitled Turkey Coop Unloading Apparatus and Method, and Ser. No. 08/960,278, now U.S. Pat No. 6,048,157 filed Oct. 29, 1997, entitled Turkey Coop Unloading Apparatus and Method, are hereby incorporated by reference.

FIELD OF THE INVENTION

This invention relates generally to the loading and unloading of contents of multi-layered containers, and more particularly to a method and apparatus for loading and unloading live poultry, and particularly turkeys, to and from a plurality of multilevel coops on a transport truck, with minimal damage to the turkeys.

BACKGROUND OF THE INVENTION

Poultry, and in particular turkeys, is typically housed for transport to processing plants in multi-layered cages, coops or containers carried by a large transport vehicle such as a flatbed trailer truck. Loading the turkeys into the coops at the farm in a systematic manner so as to avoid piling or congestion of the turkeys in the loading area and to avoid damage to the turkeys has long been a problem. Further, unloading the turkeys, for example at a processing facility, is further a problem for the same reasons.

It will be understood that while the invention hereafter is described with respect to the handling and processing of turkeys from transport trucks, the principles of this invention are not to be limited thereby. The apparatus and loading and unloading processes described in this patent and to which this invention pertain could well be applied to the unloading of other types of cargoes.

Live poultry is generally transported to modern processing plants on large flatbed truck trailers carrying the poultry in multi-layered cages or coops. A transport truck typically carries as many as 160 coops for chickens, holding approximately 13,200 chickens and as many as 120 coops for turkeys, holding approximately 1,440 turkeys. The poultry cages or coops are generally multi-level, usually six levels high for turkeys and up to 12 levels high for chickens.

The coops used for transporting turkeys are normally mounted on both sides of the transport truck trailer, with their coop doors or gates facing the outside of the trailer. The multi-level cages generally are stacked from 8–10 feet high and are built in sections of 8–16 feet long. The coops are generally about 45 inches in depth, with approximately a 6 inch ventilation air space provided between the coops down the middle of the truck. The doors of such turkey transport coops generally lift up and slide back into the coop at their tops, in an overhead door manner. Such coops are generally illustrated in my prior referenced U.S. Pat. Nos. 5,388,948; 5,466,116; 5,505,582; and 5,735,664. The reader is referred to such cross-referenced materials for a more detailed description of the coop and transport structures.

Loading of turkeys into the cages or coops on the transport vehicle has long been a problem. Such loading is very labor intensive, is difficult and often dangerous to the person doing the loading, is traumatic to the bird being handled, and often results in injury or damage to the bird.

Due to the large size of the turkeys, their loading has generally been performed by a turkey loading assembly and assisted by an operator; generally, a turkey is delivered to the coop, sometimes by conveyor belt, and then is loaded into the coop manually. In another loading process, the turkey is almost literally thrown into the coop by the momentum of the turkey produced by the conveyor belt.

Similarly, unloading of turkeys from the coops and into a processing facility has long been a problem for the processing industry. Such unloading is also very labor intensive, is difficult and often dangerous to the person doing the unloading, is traumatic to the bird being handled, and often results in injury or damage to the bird.

The unloading has also generally been performed or assisted by hand, wherein an unloading person or operator typically opens one coop at a time and individually removes each turkey from its transport cage, either lifting the bird into its confining shackles for processing within the plant, or placing the bird on a conveyor belt leading into the plant for subsequent anesthetizing and handling. Since Tom turkeys generally weigh between 25 and 40 pounds, the unloading task is extremely strenuous, time consuming and difficult—and the turkeys are generally uncooperative in the process. The process can also result in undesirable damage to the turkey, which is accentuated by the fact that larger turkeys are more susceptible to injury if roughly handled.

My prior patents disclosed automated techniques for unloading turkeys from the stacked coops onto conveyor belts moving into a processing plant by successively lifting the back end of the turkey coops so as to pivot the coops about their lower front edges, thereby depositing the turkeys from the tilted coop onto the adjacent conveyor belt. My prior patents also provide an automatic system that successively empties the contents from the coops on the transport truck and onto conveyor belts moving into the processing plant, without requiring the lifting or tipping of any of the coops on the truck. The apparatus and method of this referenced patent enables the transport truck to be systematically emptied by progressively removing the contents of coops, one at a time by the use of an indexing carriage and sliding floor assembly, without the necessity of any human intervention, until the truck is completely empty.

However, improvements can still be made in loading and unloading methods. The present invention provides an efficient, simplified and economical alternative to the methods disclosed in my prior applications and patents. As with my prior inventions, the moving and urging of the turkeys during the loading and unloading process is performed in a manner which is humane and non injurious or traumatic to the turkeys, thereby enhancing their carcass value significantly reducing the costly labor intensive processes typically practiced by prior art techniques.

SUMMARY OF THE INVENTION

This invention provides an improved method and apparatus for gently, reliably and efficiently loading and unloading cargo, for example poultry, and particularly turkeys, into and out of multi-layer loads of turkey coops. The invention provides a semi-automated loading assembly for loading turkeys into a coop or simultaneous loading into a plurality of coops. The invention also provides an improved coop configuration which facilitates automated unloading of the transport load of coops.

According to a preferred embodiment of the invention, the loading operation is performed automatically except for operator intervention in selecting the coops to be loaded, in simply attaching the loading apparatus to such coops to initiate the loading process, and in detaching the apparatus from the coops after they have been filled. If it is desired to simultaneously load a plurality of coops, loading operators are preferably used to help guide the birds into the coops to assure that the birds are evenly divided. The method and apparatus of this invention eliminates the need for loading operators to physically lift and load the turkeys into the coops of the transport load, thereby significantly reducing injury to the loading operators that inherently resulted from prior loading operations and reducing stress to the bird from being handled.

According to another preferred embodiment of the invention, the unloading operation is performed automatically except for operator intervention in selecting the coops to be emptied, in simply attaching the unloading apparatus to such coops to initiate an unloading process, and in detaching the apparatus from the coops after they have been emptied. The method and apparatus of this invention eliminates the need for unloading operators to physically unload turkeys from the coops of the transport load, thereby significantly reducing labor costs, the most costly step of prior unloading processes, and significantly reducing injury to the unloading operators that inherently resulted from prior unloading operations.

Additionally, the method and apparatus of this invention reduces the stress on the birds both during loading and unloading operations, thereby delivering a healthy, undamaged turkey to the processing facility.

According to one aspect of the invention there is provided a turkey coop suitable for automated or semi-automated loading and unloading, comprising: (a) a top wall; (b) a pair of oppositely disposed side walls; (c) a rigid, permanent floor oppositely disposed from the top wall; (d) a pair of oppositely disposed end walls, the floor and the top, side and end walls collectively defining an internal cavity for housing a plurality of turkeys, each end wall having an access port to the internal cavity therein and a moveable gate for selectively opening and closing access to the internal cavity through the access port; and (e) a flexible slideable floor positioned on top of the permanent floor, wherein the material of the slideable floor is selected to produce minimal friction when slid over the permanent floor. The slideable floor rests on and is supported by the rigid permanent floor, typically the type used in conventional coops. During the loading and unloading processes, the slideable floor is pulled, slid, or moved over the permanent floor.

According to an aspect for loading the coops according to the present invention, a turkey is brought in close proximity to the open gate of the front end of the coop by a means such as a conveyor system, for example a conventional turkey loader. The turkey is deposited onto the extracted floor and the floor is partially retracted into the coop by pull strap, cable or wire attached to the rear end of the floor, thereby calmly and passively conveying the turkey into the coop. Additional turkeys are deposited onto the floor as the floor becomes available and are moved into the coop. When the coop is fill of turkeys and the floor has been completely retracted into the coop, the floor is secured into position for transport by closing the coop gate. In a preferred embodiment, the turkey is deposited slightly inside the coop and is pulled farther into the coop by the slideable floor.

According to an aspect for unloading the coops according to the present invention, the front gate of the filled coop is opened and once again pull straps, cables or wire are attached to the floor. The floor is slowly extracted from the coop, thereby extracting the turkeys along with the floor. The extracted floor is collected on a winder or winch. The floor is extracted until all the birds have been removed from the coop. The holding wall is stationary in relation to the slideable floor, that is, the holding wall moves in conjunction with the floor.

According to a further aspect of the invention, a removable holding wall is mounted on the coop floor and extends across the internal cavity between the side walls and upwardly toward the top wall of the coop.

While the invention will be described with respect to a preferred embodiment or embodiments thereof, it would be understood by those skilled in the art that the invention is not to be limited to the specifics of either the components used or the specifics of the coop structures employed. In particular, specific holding wall and its attachment fixture means, pull straps, cables, brackets, winches, conveyor apparatus and other features and equipment will be disclosed. The invention, however, is not to be limited in scope by the use of the specific components or movement means illustrated in describing the preferred embodiment. Further, while a specific technique for loading and unloading a transport load of coops will be disclosed, the process or sequence described is not to be interpreted in a limiting manner. Those skilled in the art will readily envision other techniques, configurations and embodiments of structures which embody the claimed principles of this invention.

BRIEF DESCRIPTION OF THE DRAWINGS

Referring to the Drawings, where like numerals represent like parts throughout the several views.

PREFERRED EMBODIMENT

As discussed above, while the present invention could apply to the loading and unloading of any type of material or animal suitable for transport within a container, cage or coop, the invention will be described with respect to a preferred application of sequentially and systematically loading and unloading turkeys to and from a plurality of multi-layered columns of transport coops. The general structure of such transport coops and their multi-layered configurations upon a transport vehicle, such as the flatbed of a transport trailer are typically well-known in the art, and will not be detailed herein. However, the coops for use in the method of the present invention do have a removable gate or door that can be lifted at each of the two opposite ends, and the coops preferably extend across the entire width of the transport vehicle. Additional details to this will be described herein after. To the extent that a general understanding and overall description of such structures is required, the disclosures of my prior cross-referenced U.S. Pat. Nos. 5,388,948; 5,466,116 and 5,505,582 as well as my pending patent applications Ser. No. 08/578,170 filed on Dec. 29, 1995 and entitled Apparatus and Method for Unloading Poultry From Multi-layered Containers; and Ser. No. 08/874,084, filed Jun. 12, 1997, entitled Turkey Coop Unloading Apparatus and Method, are herein incorporated by reference as though they formed an integral part of this description. To the extent that modifications of the general coop and multi-layer coop configurations typically employed in the prior art and those disclosed in my prior patents and applications are necessary to an understanding of this invention, such details will be hereinafter described in more detail. Those skilled in the art will readily understand and appreciate how the coop structures of prior art configurations can be modified to accommodate the principles of the present invention, and conversely, how the principles of the present invention can be applied to existing coop structures.

Figure 1:
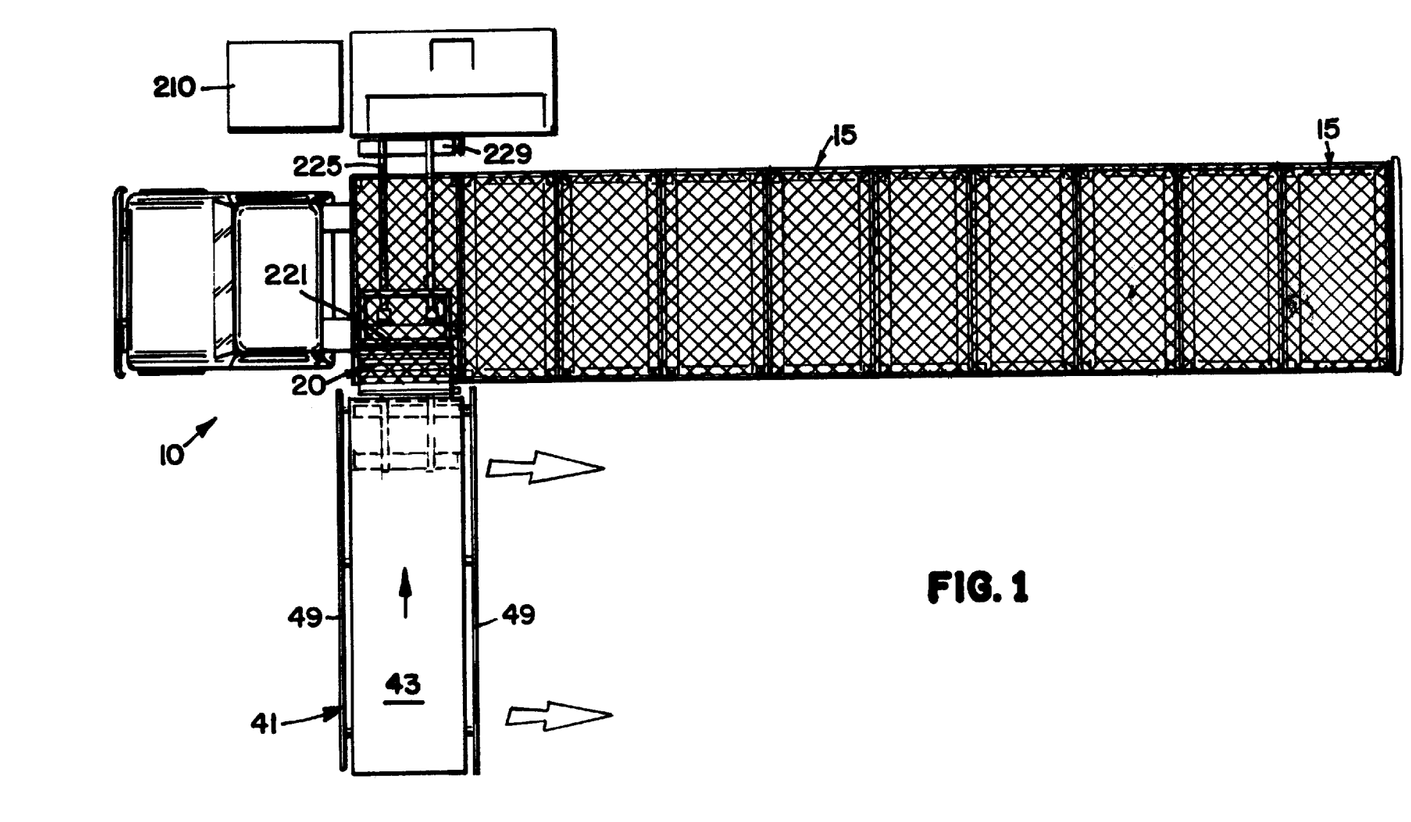
FIG. 1 is a diagrammatic top view of a loading station at a turkey farm of the type to which this invention pertains, illustrating how a transport truck having a plurality of rows of coops is positioned for loading of turkeys, and generally illustrating the positional relationship of the loading apparatus of this invention relative to the transport truck.
Figure 4:
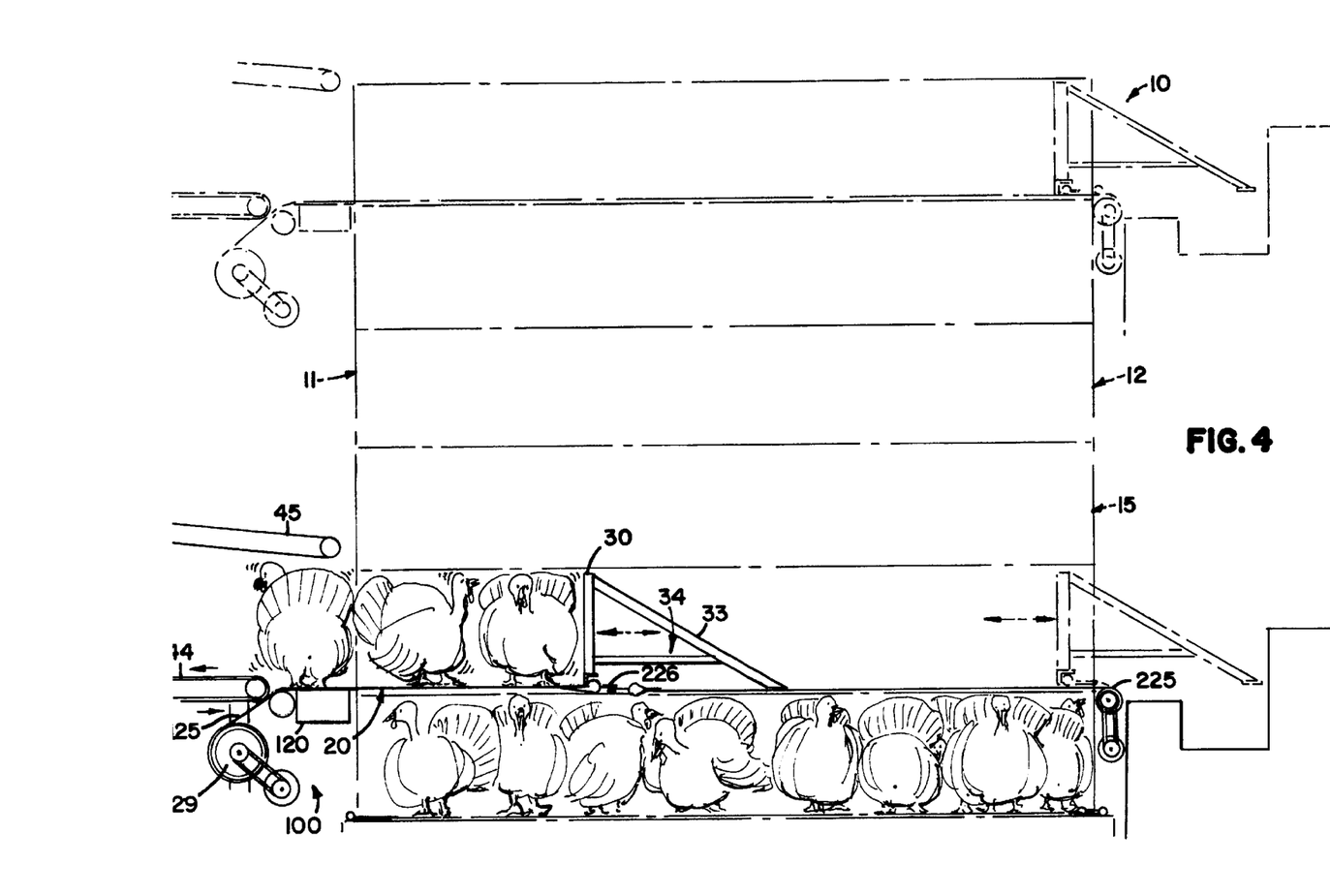
FIG. 4 is a rear view of a transport truck having a plurality of stacked coops thereon, showing the unloading of turkeys therefrom.

Referring to FIG. 1, a flatbed transport truck of the type often used to transport turkeys from a farm to a processing plant, is generally illustrated from the top at 10. The trailer bed or deck of the truck carries a multi-layered plurality of turkey cages or coops 15 that are arranged in parallel fashion from the front to the rear of the trailer bed respectively. In a preferred embodiment, the coops 15 are stacked six high as shown in FIG. 4, making six layers or rows of coops requiring emptying at the processing plant. The coops are generally constructed in module configuration, with each module containing from two to four vertical columns or stacks of coops connected together by means of appropriate framing structures. In a preferred embodiment, each coop is approximately four feet wide (in the longitudinal direction of the truck bed), about 95 inches deep (in the width direction of the truck bed), and from 14–16 inches in height.

Figure 2:
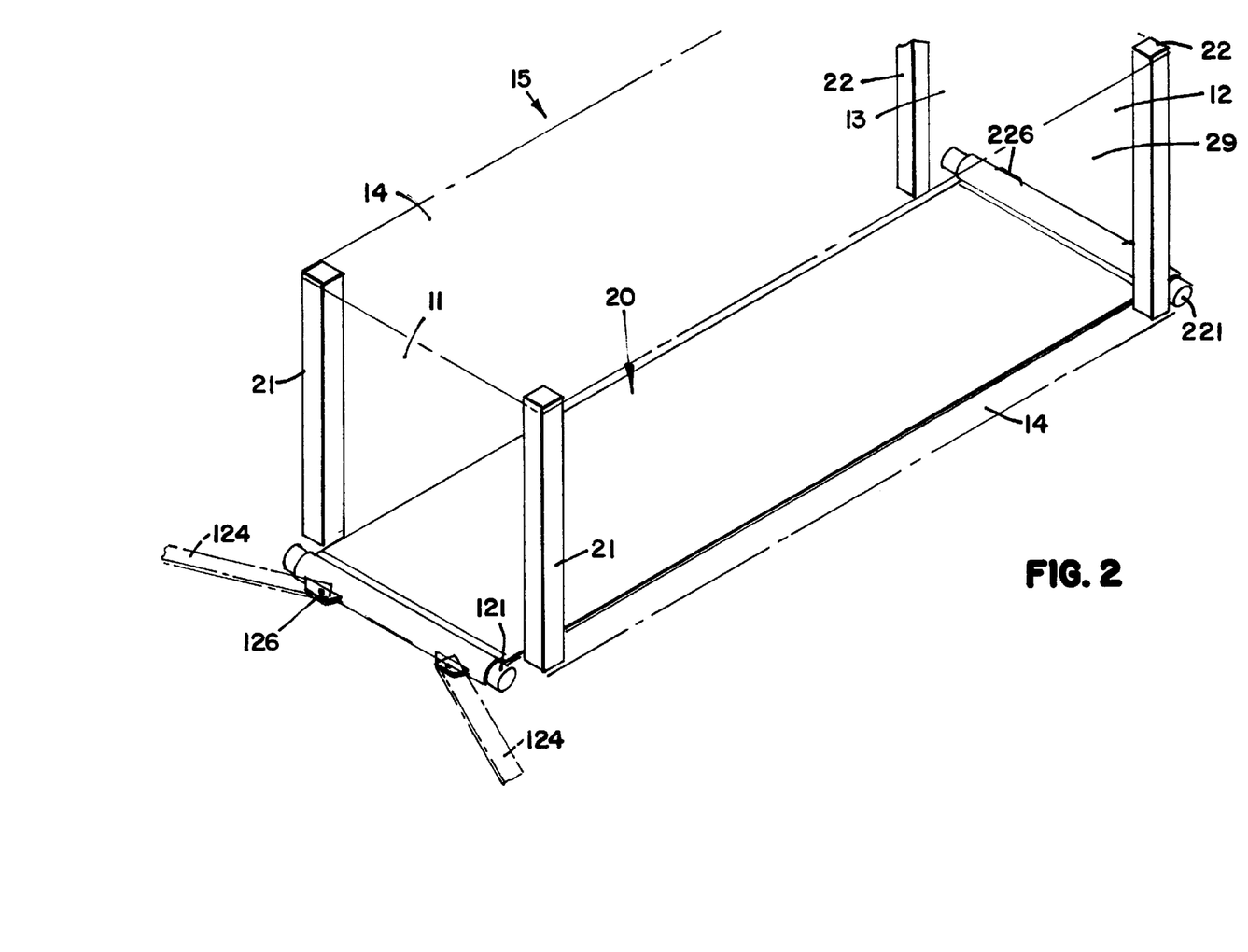
FIG. 2 is a perspective view of a coop for transporting turkeys therein.

As is typical of coops in the industry, coop 15, for example shown in FIG. 2, has a top 13, side walls 14 and front end wall 11 and rear end wall 12 formed from a wire mesh material (having one inch×two inch mesh openings in the preferred embodiment) and a mesh gate member (not illustrated) at each end wall 11, 12 mounted for sliding pivotal motion in overhead-door manner relative to the ends of the coop, such that when in an "open" position, the coop door or gate lies generally parallel to and in close proximity with the top mesh portion 13 of the coop 15. The more detailed description of the general operation of such coop assemblies can be found in my prior referenced application and patents, and will not be detailed herein.

Novel to the coops of the present invention, each coop has a flexible bottom floor 20, that lays on top of a rigid permanent coop floor. The flexible floor is slideably removable from the coop by sliding over the top of the permanent coop floor, yet is fixedly secured in the coop during transport. During transport, the floor is secured at each of the coop ends 11, 12 by the coop door dropping down and latching over the floor, so that floor 20 securely extends throughout the coop and provides a surface on which the turkeys can stand. During loading processes, as will be explained in greater detail below, the floor 20 is slideably removed or extracted from the coop 15, so that the end of the floor usually located at rear end 12 is at front end 11. As the turkeys are loaded onto floor 20, floor 20 is slid of pulled back into coop 15 toward end 12 thereby exposing a new portion of floor 20 onto which a turkey can be loaded. A passive method such as this eliminates the need for the bird to move himself, thereby reducing the stress on the bird.

Such floors may also replace or make unnecessary the top mesh portion of coops positioned beneath the top coop, as the bottom surface of the permanent floor of an overlying coop also acts as the top of the next lower coop.

Also novel to the coops of the present invention, the coops extend across the entire width of the truck, unlike conventional coops that extend approximately half the width. Conventional coops could be modified to provide the coops of the present invention, for example, by removing the holding wall of two coops and joining the walls so that the new coop is twice the length of the old coops. By eliminating the center back wall of the conventional coops to form the coops of the present invention, the overall weight of the coops is decreased, thereby allowing more loading of heavy cargo onto the truck.

The coops are supported in their stacked module orientation by means of a plurality of upright corner post members in a manner typical of that used in the art. In FIG. 2, the rear upright corner post members are indicated at 22, and the front upright corner posts are indicated at 21. The corner posts are typically interconnected in both the length and width directions of the coop by means of a plurality of horizontal crossframe members (not illustrated). The crossframe members are welded to the rear upright corner post 22 and to the front upright corner posts 21. The front and rear upright corner posts 21, 22, any crossframe members, and any other beams or members collectively provide a structural support framework for the stacked coop modules. The coop screening or mesh, which forms the sidewall portions 14 of the coops, is secured to the above-described support framework members.

At the bottom of the coop is located a rigid, permanent floor 19 (in FIG. 5) that supports flexible, slideable floor 20. Floor 20 terminates at bars 121, 221. Floor 20 is secured in coop 15 by extending floor 20 from back end 11 to rear end 12 and shutting the coop gates so that bars 121, 221 are located outside of the coop internal cavity.

While a preferred configuration of a turkey coop has been described, it will be understood by those skilled in the art that other variations of the coop structure can be configured and used in association with the principles of this invention.

FIG. 1 generally diagrammatically illustrates the positioning of a transport truck 10 during a loading operation, relative to the loading apparatus of this invention. Note that the coops 15 extend essentially the entire width of truck 10. A coop 15 that extends the entire width of the truck 10 rather than only half the width, improves the stability of the truck 10 during both loading and unloading processes because the weight of the cargo, i.e., the turkeys, is distributed across the width of the truck rather than on only one side. Additionally, a coop 15 extending the entire width eliminates the need to load and unload from both the left and right sides of the truck; loading and unloading can be done from either the left or right side.

During a loading process, the turkeys are brought from the holding pen, barn, or other location to the vicinity of the truck 10. A conventional inclined conveyor assembly or turkey loader 41 carries turkeys up to the coops 15 on the truck 10. The loader assembly 41 has associated with it appropriate side walls 49 for maintaining turkeys carried by the conveyor surfaces during movement.

In the preferred embodiment, the loader assembly 41 is an integral unit which is vertically and transversely moveable relative to the transport truck. The loader assembly 41 has appropriate support structure for providing structural support to the assembly and to enable the entire conveyor assembly to be operatively raised and lowered. In the preferred embodiment, the conveyor assembly 41 includes a continuously moving conveyor belt 43. The configuration of a support frame for conveyor assemblies 41 and operator platforms is described in my prior referenced patents and applications. The loading conveyor assembly 41 may be of any convenient width, but is preferably from 36 to 48 inches. To the extent that the disclosures of those applications are necessary to an understanding the conveyor assembly and support structure configuration, my prior references patent applications and patents are hereby incorporated by reference.

The loader conveyor assembly 41 may include an operator support platform (not illustrated) on which an operator, monitoring and assisting the loading operation, can walk back and forth longitudinally along the side of the loader assembly 41. The operator support platform also functions as a foundation for mounting additional portions of the loading apparatus, if needed. The conveyor assembly 41 has associated therewith a retaining wall 49 longitudinally extending along the outer edge of the assembly 41 for preventing turkeys from falling off of the moving conveyors 43.

Turkeys or other cargo are loaded into the coops by being carried along the loader conveyor assembly 41 and then loaded into the coops by being transferred to the slideable floor 20. The collection of equipment used to extract the floor out of the coop, for example, straps 125, idler roll 128, and winch 129, (and support floor 120 when used during the unloading process) is labeled extracting mechanism 100 in FIGS. 3, 4 and 5 of this application. When using the present invention for loading of the coops 15, the extracting mechanism 100 is mounted on the loader conveyor assembly 41. When unloading coops 15, the extracting mechanism 100 is permanently mounted on the unloading conveyor system. Likewise, the collection of equipment used to retract the floor back into the coop, cables 225, idler roll 228, and winch 229, is labeled retracting mechanism 200 in FIG. 3 of this application.

In particular, floor 20, which rests on a permanent floor, is a flexible, slideable floor made from a material having enough strength and durability to be able to withstand the weight and claws of typically 10–20 turkeys at a time, yet be flexible enough to be wound around rollers and a winch without undue stress. Examples of usable materials include plastic or rubber (including reinforced plastic or rubber) or impregnated canvas materials. Example of usable plastic materials include polyethylene, polypropylene, nylon, and polycarbonate. Examples of reinforcing materials include meshes, staple fibers or strands randomly distributed throughout the floor, or continuous fibers (for example, polyimide (e.g., KEVLAR), nylon, metal wire, fiberglass, etc.) running the length of the floor. Preferably, any reinforcing material is embedding within the thickness of the floor, however, in some applications it may be located at the surface of either side of the floor. A segmented or sectioned metal floor may also be usable. The top surface of the flexible slideable floor 20 may be textured so as to provide an increased frictional surface on which the turkeys can stand. The preferred floor 20 can be a 15–20 mil (0.015–0.020 inch) thick polyethylene sheet.

Floor 20 should be sized to extend from the front end 11 to the rear end 12 of coop 15, and should extend across the width of the coop between the corner posts 21, 22. Typically, the floor will be approximately 42 inches by 95 inches in size. Preferably, the length of the floor 20 can be slightly longer than the length of the coop interior so that a portion of the floor 20 extends outside of the coop gates; it is in this manner that floor 20 is secured during transport. More details regarding the securing of floor 20 during transport will be described below.

Floor 20 rests on and slides over a permanent, rigid floor 19 that is typically integral with the coop. That is, the permanent lower floor is not removable at least not easily. The permanent floor 19 is preferably a floor as used in conventional coops, such as a thick reinforced plastic known as "Kemlite". The top of the permanent floor 19 (or bottom of the flexible floor 20) may be coated with a release agent, for example TEFLON™ or the like, to facilitate sliding of floor 20 over the permanent floor. The permanent bottom floor and floor 20 should be selected with the intent of having low surface friction between the two floors.

Figure 3:
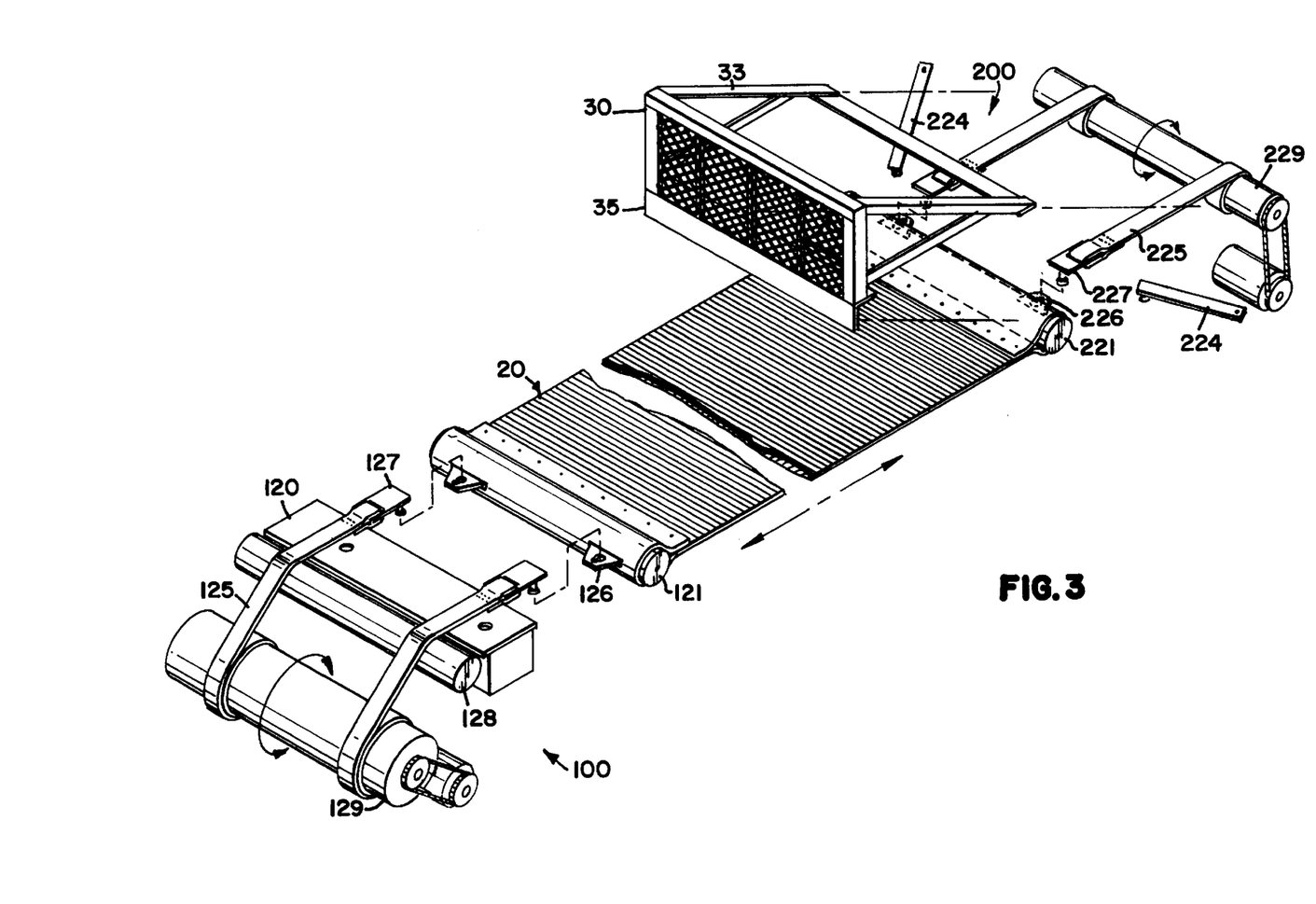
FIG. 3 is a perspective view of the general components of the loading and unloading mechanisms according to the present invention.

As illustrated in FIG. 3, each end of floor 20 terminates at bar 121, 221. In a preferred embodiment, bar 121, 221 is a ⅜ or ⅝ inch diameter pipe around which the flexible floor 20 is wrapped and secured. Floor 20 wraps around bar 121, 221 and is secured back to itself by a seaming means such as staples, stitching, glue, grommets, or the like. In another embodiment, bar 121, 221 can be a two piece bar, each piece being positioned on opposites sides (i.e., top and bottom) of floor 20, which secures floor 20 therebetween. Bar 121, 221 has a loop bracket 126, 226 that is either welded to or integral with an edge of the bar 121, 221. The bracket 126, 226 engages and releasably secures an end 127, 227 of cable or strap 125, 225. Bracket 126, 226 is preferably a metal plate, approximately ⅛ inch thick, welded to bar 121, 221. If floor 20 wraps around bar 121, 221, floor 20 will have perforations therethrough to allow the bracket 126, 226 to extend through the floor 20. Alternately, a bracket 126, 226 may be located at each distal end of bar 121, 221 to eliminate the perforations in the floor.

Each strap 125, 225 has a end 127, 227 adapted for each attachment to loop bracket 126, 226. It is not necessary that strap 125, 225 is a conventional 'strap', but may be any elongate material, for example, rope, wire, cloth, cable, or webbing of any width that functions to provide tension on floor 20. Each of the straps 125, 225 may be entrained over a roll 128, 228 and secured to a cable winch 129, 229.

Figure 5:
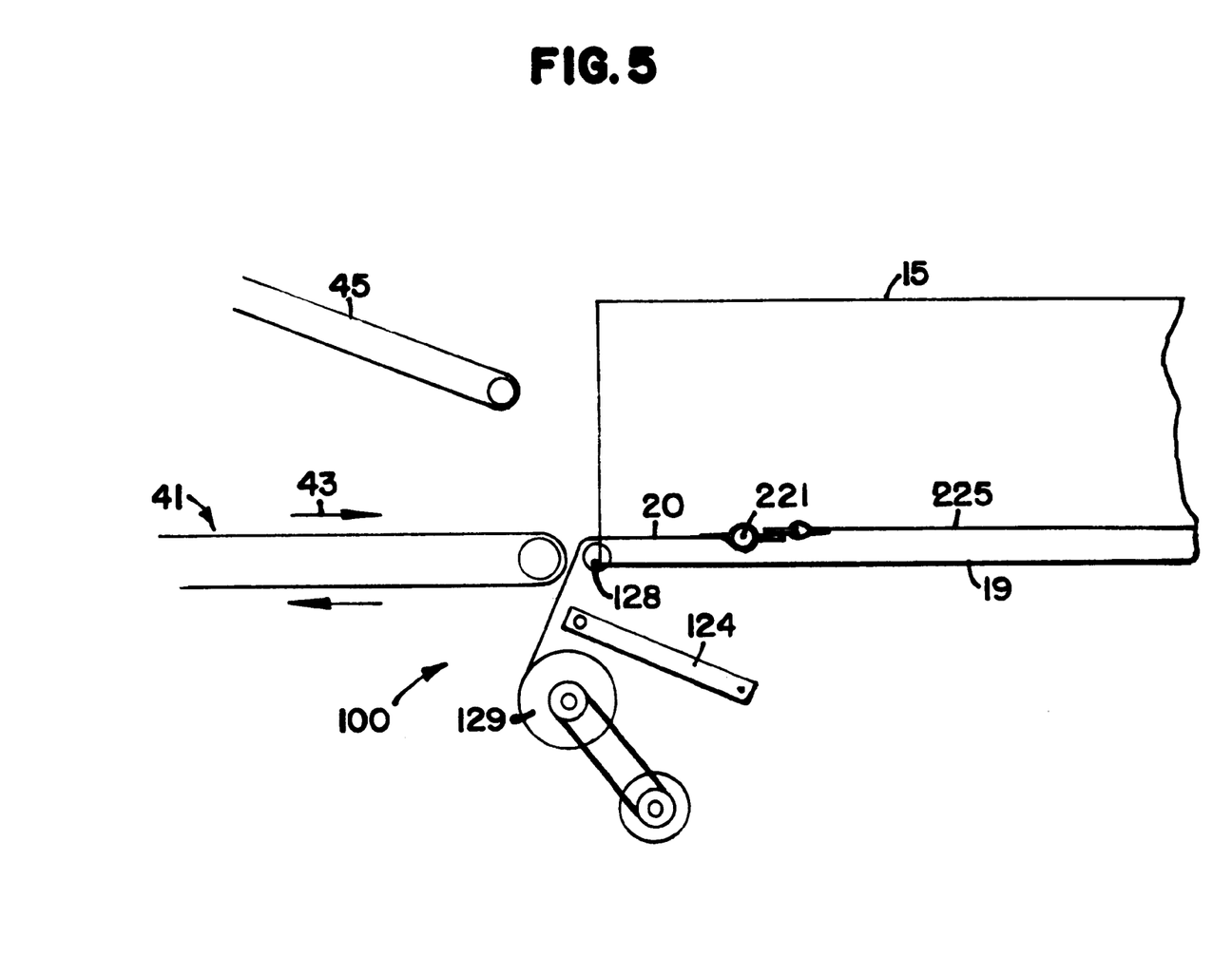
FIG. 5 is a side view of components of the loading mechanism according to the present invention.

Preferably for a loading operation, the roll 128 and winch 129 are secured to the loader conveyor assembly 41. FIG. 5 shows one arrangement of straps 125, idler roll 128, winch 129, and support arms 124. Support arms 124 secure straps 125 when the straps are not in use, for example when not using the loader or when moving the loader assembly 40 from one coop to the next.

Depending on the particular set-up of the equipment, i.e., the straps 125, 225, roll 128, 228, support floor 120, winch 129, 229, etc., the distance between and the specific placement of the equipment will vary. In some embodiments, certain components of either the extracting mechanism 100 or the retracting mechanism 200 may be excluded, depending on the configuration.

In most loading processes, support floor 120 will not be needed because the turkeys are loaded directly into the coop 15. However, during unloading and certain loading operations, when the floor 20 is pulled out from the coop 15 toward the front end 11, a portion of the floor 20 will be not supported by any support structure within coop 15 but will still be carrying the weight of a bird.

FIG. 4 shows an unloading process where a turkey is positioned on floor 20 outside of coop 15. To provide support for this turkey, a temporary floor support structure 120 is located below floor 20 to support the floor 20 and the turkey on the floor 20 before the turkey is deposited on to the conveyor belt 44. Temporary support structure 120 is designed to provide a continuous firm surface on which the floor 20 can slide and on which the turkey can stand. Temporary support structure 120 may be braced and supported by the same structure that supports winch 129 and idler roll 128. Examples of materials for making temporary support structure 120 include wood, metal, plastics, or the like; these materials may be coated with a release agent, for example TEFLON® or the like, to facilitate sliding of floor 20 thereover.

In most configurations according to the present invention, a holding wall 30 is set on top of the slideable floor 20 and braced by a fixture means 35. Holding wall 30 acts as a retainer and urges the turkeys to remain on floor 20 as the floor 20 with turkeys thereon is pulled or moved forward toward the front 11 of coop 15. Holding wall 30 provides a barrier to any turkey that may panic and attempt to jump off of the floor end or resist the movement of the floor. Holding wall 30 is a device designed to gently coax the birds to remain stationary on the floor 20 and not attempt to jump from the floor 20 and to remain in the coop 15 as the floor is extended from the coop 15. Holding wall 30 is not intended to physically push the birds, but only intended to keep the birds on the sliding floor 20 during the unloading and, optionally, loading processes.

Holding wall 30 preferably extends the width of floor 20 and toward the top wall or ceiling of coop 15. Preferably, any space or gap between the top of holding wall 30 and the ceiling 13 is sufficiently small so that no turkey or other cargo can slip therethrough. The holding wall 30 may be of solid or mesh construction and of sufficient strength and construction to withstand the weight of the turkeys held by the coop. The holding wall 30 is supported on and attached to the floor 20 by fixture means 35. Fixture means 35 could be any of a variety of attachment systems, for example, a permanent ridge or protrusion on floor 20 onto or into which holding wall 30 can attach, or a perforation or plurality of perforations in floor 20 into which holding wall 30 can attach. In the preferred embodiment, the fixture means 35 includes an angle iron on holding wall 30 that fits with the same bar 221 as used as the terminus of floor 20. The holding wall 30 should be easily and quickly removable from floor 20.

In a preferred embodiment, holding wall 30 has an angular brace member 33 connected at preferably the top edge of holding wall 30 to provide stability for holding wall 30. The angular brace 33 preferably extends forward and upwardly from floor 20. The angular brace member 33 provides increased vertical stability to the holding wall 30 and prevents horizontal rotation of the holding wall 30 as it may contact a turkey being unloaded from the coop when the wall is moving in the forward direction. The angular brace member 33 is preferably butt welded to the top edge or back of the holding wall 30, as best indicated in FIGS. 3 and 4, and includes a horizontal brace 34 level with the bottom of the holding wall 30 that provides support for angular brace and holding wall 30. Optionally, brace 34 may be raised above the bottom of holding wall 30. Depending on the placement of holding wall 30 on the floor 20, horizontal brace 34 may rest on floor 20 or on straps 225. The holding wall 30 may be slightly angled forward toward the front to facilitate in urging turkeys engaged thereby toward the front end 11 of the coop 15. The holding wall 30 may further have a rubber protective covering to minimize injuries to the turkeys.

As will be appreciated, the holding wall 30, holding wall attachment fixture 35, angular brace 33 and horizontal brace 34 are configured so as not to interfere with the operative portions of the coop and to fit in spaces between the existing corner posts 21, 22, and coop walls 14 and ends 11, 12.

Accordingly, the principles of the present invention can be applied to existing stacked coop structures by retrofitting such structures, without requiring total replacement of the existing coop structures.

The equipment set-up for loading the turkeys includes a conventional loader conveyor assembly 41, extraction mechanism 100 and retraction mechanism 200, and a coop 15, typically a plurality of coops 15 arranged in rows on a transport truck 10. The extraction mechanism 100 is typically mounted on loader assembly 41, for example, as shown in FIG. 5. Retraction mechanism 200 is typically mounted for example, on a small vehicle such as pick-up truck 210 in FIG. 1. Both the extraction and retraction mechanisms 100, 200 should be sufficiently mobile and positionable in all directions (horizontally and vertically), for example, by scissor-lifts, hydraulics, gears, or the like, so that the mechanisms 100, 200 and not the transport truck 10 are shifted during loading and unloading of the multiple coops. However, it is understood that it may be desirable in some operations to move the truck 10.

For the loading operation, the transport truck 10 is driven into the loading area of the farm and is positioned, preferably perpendicular to loader conveyor assembly 41 and to the turkeys to be loaded. The loader assembly 41 and floor extracting apparatus 100 of the present invention are moved into position and aligned with the coop 15 or coops to be loaded. The floor retracting mechanism 200 of the present invention is moved into to position and aligned on the opposite end of coop 15. They may entail, for example, aligning pick-up truck 210 with coop 15. FIG. 1 illustrates a typical loading procedure.

Typically, loading begins at the front of the truck 10 and progresses vertically up the first stack of coops. Once the top coop is loaded, either the truck 10 is moved forward, or the loader assembly 41 and the pick-up truck 210 are moved back to the next stack of coops. This second stack of coops is then loaded, progressing down. The remainder of the truck 10 is loaded in this manner.

The loading method of the present invention is particular useful in that the entire width of the truck is loaded at once, which improves convenience and safety for those working around the truck. For example, with typical coop constructions, those that extend only half of the width of the truck, the entire left side (or driver's side) of the truck is loaded first, after which the truck is turned around and the entire right side is loaded. Loading in such a manner, with the weight of the birds only on one side, creates a very unsteady, unbalanced and unstable truck. Further, there is the inconvenience of having to turn the truck around. The present invention eliminates these problems because the entire width of the truck is loaded.

To load the turkeys into coop 15, the turkeys are first brought to the coop 15 via loader conveyor assembly 41, which may include a top guide 45 (as shown in FIG. 5) to keep the turkeys from jumping out of the conveyor and to keep them from hitting their heads on the coop 15. Floor 20 has previously been extracted from coop 15 by extracting mechanism 100 so that floor 20 is partially extended out of coop 15 and wound around winch 129 as illustrated in FIG. 5.

To extract the floor 20, first the extraction mechanism 100 and the retraction mechanism 200 must be aligned with the coop 15 to be loaded. If not already open, the operator opens the gates at each end 11, 12 of the coop 15 by pivoting the gates upward and locking the gates in an open position. This operation as well as other operator assisted functions could be automated. Once the gates are open, straps 125, 225 are detached from arms 124, 224 where they are secured when not in use, and are attached to the floor 20 at their respective ends by the operators. Preferably, if more than one strap 125, 225 is used at each end (for example, two straps are shown in FIG. 3 at each end of floor 20), all straps 125 are entrained over and collected on the same winch 129, to ensure an even and consistent tensioning. Similarly, all straps 225 are entrained over winch 229. In particular, ends 127 of straps 125 are attached to brackets 126 and tension is applied to the straps and floor. Ends 227 of straps 225 are similarly attached to brackets 226 at back end 12 of floor 20, and holding wall 30 is placed onto fixture means 35. The floor 20 is extracted from coop 15 by pulling straps 125 which in turn pass floor 20 over idler roll 128, and then winding floor 20 on winch 129. Tension should be maintained on floor 20 and straps 125, 225, so that the floor is wound evenly and neatly on winch 129. A portion of floor 20 should remain unrolled within coop 15 so that the first turkey can be loaded onto the floor 20.

Preferably, once the first turkey has been transferred to the floor 20 from loader assembly 41, a portion of the floor 20 is retracted back into the coop 15 by retracting strap 225 and releasing strap 125 and winch 129. It is not necessary for the bird to move or walk on his own, but he may remain stationary in respect to the floor, for it is the floor 20 that is being moved. Second, third and additional turkeys are loaded into the coop 15 in the same manner. After the transfer of each turkey to the slideable floor 20, the floor 20 is retracted farther into coop 15 toward end 12. The retraction of the floor 20 may occur continuously or be incremented only after a bird is loaded. Once the floor 20 has been completely retracted into the coop 15 and the coop 15 is full of turkeys, the straps 125, 225 are removed from brackets 126, 226 and secured onto the arm supports 124, 224. The gates of the coop 15 are shut, and the retracting and extracting mechanisms 100, 200 are moved to the next coop to be loaded. Typically, the next coop to be loaded is in the same vertical row as the previous coop, either above or below the first coop.

Once the coops are loaded, they are transported to the desired location, typically a processing plant, and the turkeys are unloaded from the coops by essentially the reverse of the loading process but with the aid of support floor 120. In an unloading operation, the transport truck 10 is driven into the unloading dock area of the processing plant and is appropriately positioned by alignment markers or the like relative to the floor extracting and retracting mechanisms 100, 200. Prior to unloading, the end 127 of strap 125 will be secured on arms 124 and the temporary floor support 120 will be secured so as not to interfere with movement of the transport truck 10. Unloading will preferably begin from the rear coops of the truck 10 and will progress horizontally until the row is completely, after which the floor extracting and retracting mechanisms will be moved vertically up one row and the process will repeat.

When the transport truck is properly positioned in the unloading station, the floor extracting and retracting mechanisms 100, 200 are aligned with the coop 15 desired to be unloaded. Because the unloading area of a processing facility uses the unloading equipment much more often that a single turkey farmer, the extracting and retracting mechanisms 100, 200 may be more permanent structures than those used at the loading site (typically, the farm).

Additionally, each vertical coop row will have a dedicated extracting and retracting mechanism 100, 200 so that the unloading proceeds quickly. Thus, a set of ten extracting mechanisms 100 and ten retracting mechanisms 200 will be used for unloading a typical truck 10.

As in the loading process, straps 125, 225 are removed from arms 124, 224, and are connected at ends 127, 227 to brackets 126, 226 at each end of floor 20. Support floor 120 is positioned. In some embodiments, it may be beneficial to have holes or other attachment means for straps 125 in support floor 120 rather than having dedicated arms 124. If not already opened, the gates at each end of coop 15 are opened. Holding wall 30 is placed onto floor 20 and secured in place by fixture 35. As the winch 129 rotates, the floor 20 and turkeys thereon are extracted and the turkeys are carried toward the front end 11 of the coop 15 and out the open gate of coop 15. As the floor 20 progresses toward the front of the coop, so does the holding wall 30. Any turkeys resisting the movement of the floor 20 are engaged by holding wall 30 and are urged toward and out of the open gate of the coop and onto the conveyor 44.

Winch 129 used for unloading will typically have a more powerful driving mechanism than winch 129 used for loading, because during unloading, the winch 129 must move about 500–700 pounds of turkeys. It has been found that to pull approximately 640 pounds, a force of only about 25 pounds is needed when using a polyethylene floor 20 over a permanent "Kemlite" floor.

During the unloading, the extracted floor 20 brings the turkeys away from the coops 15 to prevent obstruction of the front opening of the coop 15 and to prevent bruising of the turkeys as they are removed from the coops 15. If turkeys are pushed directly from the coops 15 onto the transport conveyors 44 during unloading, frequently the turkeys are only partially out of the coop 15 with only a portion of their weight on the transport conveyor 44. In this scenario, the movement of the transport conveyor 44 may forcefully push the turkey against the coop corner post 21, thereby bruising the turkey. The extracted floor 20 overcomes the problems of turkeys obstructing the opening of the coop 15 and turkeys being bruised. The transport conveyor 44 can be individually operator controlled, if desired, to prevent bunching up of the turkeys thereon which may cause injury to the turkeys. Retaining walls prevent the turkeys from falling off of the conveyor.

When the coop unloading process has been completed, the floor 20 and holding wall 30 will be positioned near the front 11 of the coop as illustrated in FIG. 1. Cables 225 return the floor 20 and attached holding wall 30 to their original positions. Holding wall 30 may be removed either before or after returning to the original position at end 12, or may be left attached to floor 20. The gates are typically shut after the turkeys and holding wall 30 are removed.

Electrical and hydraulic circuits and other various motion producing powered components of the apparatus have not been included. It will be understood that those skilled in the art can readily provide the appropriate hydraulic and electrical control circuits needed to operate such components as the winches 129, 229, the various conveyor belts 43, 44, and loader conveyor assembly 41, and the positioning equipment and any other structures. Any motors and gears should be appropriately sized to be able to provide the sufficient power to pull the slideable floor 20.

It will be appreciated that the apparatus and method described for both the loading and unloading turkeys from the farm holding pens to transport coops to the processing facility provides a safe, rapid and semi-automated process for performing the unloading operation in a simple, cost effective and reliable manner and which minimizes injury and damage to the birds being unloaded. Although the Figures have been drawn and the specification describes loading and unloading the turkeys from the left side of the truck, the loading and/or unloading operations could be switched so that they are done from the right side of the truck.

While the invention has been described with respect to a preferred embodiment thereof, and with respect to specific types of components used therein, it will be understood by those skilled in the art that the invention is not to be limited in any manner by the specifics of either the disclosed embodiment or the components described. Such embodiments and components have been described to illustrate clear examples of how the principles of the invention can be specifically applied. All alternatives and modifications of the foregoing are intended to be covered within the broad scope of the appended claims.

I claim:

1. An apparatus for loading or unloading turkeys from a coop, the coop having sidewalls, end walls, a permanent floor, and a moveable flexible floor overlying the permanent floor, a moveable gate in at least one end wall of the coop, the gate for selectively opening and closing an access port into the coop cavity, the apparatus comprising:

(a) a floor extracting mechanism adapted and configured to extract the moveable flexible floor from over the permanent floor and out from the coop through the access port; and (b) a floor retracting mechanism adapted and configured to retract the moveable flexible floor over the permanent floor and into the coop.

2. The apparatus of claim 1, wherein the moveable floor slides over the permanent floor.

3. The apparatus of claim 2, wherein the floor extracting mechanism comprises a strap adapted for attachment to an end of the moveable floor and a winch.

4. The apparatus of claim 3, wherein the floor extracting mechanism is positioned on a moveable turkey loader assembly.

5. The apparatus of claim 3, wherein the floor extracting mechanism is positioned on a fixed turkey unloading assembly.

6. The apparatus of claim 2, wherein the floor retracting mechanism comprises a cable adapted for attachment to an end of the moveable floor and a winch.

7. The apparatus of claim 6, wherein the floor retracting mechanism is positioned on a moveable vehicle.

8. The apparatus of claim 6, wherein the floor retracting mechanism is positioned on a fixed turkey unloading assembly.

9. A method of loading turkeys to a transport coop of the type having four walls, a slideable floor positioned on a permanent floor, and an openable gate in two opposite sidewalls, the gates closing an access port into the coop, the method comprising the steps of:

(a) extracting at least a portion of the slideable floor out of the coop;

(b) positioning a turkey on the extracted floor; and (c) retracting the slideable floor with the turkey thereon into the coop, wherein the step of extracting is accomplished by hooking a first cable to an end of the slideable floor and pulling the slideable floor out of the coop, and further wherein the step of retracting is accomplished by hooking a second cable to another end of the slideable floor and pulling the slideable floor into the coop.

10. A method of unloading turkeys to a transport coop of the type having four walls, a slideable floor positioned on a permanent floor, and an openable gate in two opposite sidewalls, the gates closing an access port into the coop, the method comprising the steps of:

(a) extracting at least a portion of the slideable floor out of the coop;

(b) removing a turkey from the extracted floor so that no turkeys remain on the floor; and (c) retracting the slideable floor into the coop, wherein the step of extracting is accomplished by hooking a first cable to an end of the slideable floor and pulling the slideable floor out of the coop, and further wherein the step of retracting is accomplished by hooking a second cable to another end of the slideable floor and pulling the slideable floor into the coop.

11. The method of claim 10, wherein the step of extracting further includes attaching a removable holding wall to the slideable floor.

12. A method of loading turkeys into a transport coop of the type having four walls, a slideable floor positioned on a permanent floor, and an openable gate in one sidewall, the gate closing an access port into the coop, the method comprising the steps of:

(a) extracting at least a portion of the slideable floor out of the coop through the access port;

(b) positioning a turkey on the extracted floor; and (c) retracting the slideable floor with the turkey thereon into the coop, wherein the step of extracting is accomplished by pulling the slideable floor out of the coop, and further wherein the step of retracting is accomplished by pulling the slideable floor into the coop.

13. A method of unloading turkeys from a transport coop of the type having four walls, a slideable floor positioned on a permanent floor, and an openable gate in one sidewall, the gate closing an access port into the coop, the method comprising the steps of:

(a) extracting at least a portion of the slideable floor out of the coop through the access port;

(b) removing a turkey from the extracted floor so that no turkeys remain on the floor; and (c) retracting the slideable floor into the coop, wherein the step of extracting is accomplished by pulling the slideable floor out of the coop, and further wherein the step of retracting is accomplished by pulling the slideable floor into the coop.

* * * * *

UNITED STATES PATENT AND TRADEMARK OFFICE
CERTIFICATE OF CORRECTION

PATENT NO. : 6,109,215
DATED : August 29, 2000
INVENTOR(S) : Jerome

It is certified that error appears in the above-identified patent and that said Letters Patent is hereby corrected as shown below:

Column 3,
Line 60, "fill" should read -- full --

Column 6,
Line 20, "comer" should read -- corner --
Line 20, the "comer" should read -- The corner --

Column 10,
Line 31, repetitive: delete "to"; "is moved into to position" should read -- is moved into position --

Column 11,
Line 57, "completely" should read -- complete --
Line 64, "that" should read -- than --

Column 12,
Line 38, "comer" should read -- corner --

Signed and Sealed this

Eighth Day of January, 2002

Attest:

JAMES E. ROGAN
Attesting Officer    Director of the United States Patent and Trademark Office